(12) United States Patent
Wang

(10) Patent No.: US 11,994,958 B2
(45) Date of Patent: May 28, 2024

(54) INFERENCE SERVICE MANAGEMENT METHOD, APPARATUS AND SYSTEM FOR INFERENCE PLATFORM, AND MEDIUM

(71) Applicant: INSPUR SUZHOU INTELLIGENT TECHNOLOGY CO., LTD., Jiangsu (CN)

(72) Inventor: Meng Wang, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/271,867

(22) PCT Filed: Sep. 29, 2021

(86) PCT No.: PCT/CN2021/121909
§ 371 (c)(1),
(2) Date: Jul. 12, 2023

(87) PCT Pub. No.: WO2022/262148
PCT Pub. Date: Dec. 22, 2022

(65) Prior Publication Data
US 2024/0036990 A1    Feb. 1, 2024

(30) Foreign Application Priority Data
Jun. 15, 2021 (CN) .......................... 202110659833.9

(51) Int. Cl.
*G06F 11/14* (2006.01)
*G06N 5/04* (2023.01)

(52) U.S. Cl.
CPC ...... *G06F 11/1469* (2013.01); *G06F 11/1402* (2013.01); *G06N 5/04* (2013.01); *G06F 2201/80* (2013.01)

(58) Field of Classification Search
CPC .. G06F 11/1469; G06F 11/1402; G06F 11/14; G06F 11/302
See application file for complete search history.

(56) References Cited

U.S. PATENT DOCUMENTS

| 8,984,536 B1 | 3/2015 | Hushon, Jr. et al. |
| 2018/0302498 A1* | 10/2018 | Xie ........................ G06N 5/022 |

(Continued)

FOREIGN PATENT DOCUMENTS

| CN | 102802143 A | 11/2012 |
| CN | 107154960 A | 9/2017 |

(Continued)

OTHER PUBLICATIONS

Wen Liang, et al. "Active Database and Its Applications in Decision Support System." Microcomputer Development, 14(8), Aug. 2004.

(Continued)

*Primary Examiner* — Yolanda L Wilson
(74) *Attorney, Agent, or Firm* — IPro, PLLC

(57) ABSTRACT

An inference service management method, apparatus, and system for an inference platform, and a medium, the method comprising: detecting whether there is inference service corresponding to the inference service record in a server according to an inference service record in a database (S110); and if not, then restoring the corresponding inference service according to the inference service record (S120). According to the method, an inference service in a server is detected according to an inference service record in a database to determine whether there is inference service corresponding to the inference service record in the server, if not, it means that the inference service record is inconsistent with a real inference service, and then corresponding inference service may be restored according to the inference service record.

18 Claims, 2 Drawing Sheets

(56) References Cited

U.S. PATENT DOCUMENTS

2020/0125722 A1* 4/2020 Iyer ..................... G06F 11/0754
2020/0396228 A1* 12/2020 Tokuchi ................ H04L 9/3239

FOREIGN PATENT DOCUMENTS

| | | | |
|---|---|---|---|
| CN | 108629526 A | | 10/2018 |
| CN | 109144670 A | | 1/2019 |
| CN | 109582497 A | | 4/2019 |
| CN | 110808881 A | | 2/2020 |
| CN | 111324457 A | | 6/2020 |
| CN | 111857949 A | | 10/2020 |
| CN | 112015521 A | | 12/2020 |
| CN | 112099989 A | | 12/2020 |
| CN | 112214357 A | | 1/2021 |
| CN | 112231055 A | | 1/2021 |
| CN | 112291299 A | | 1/2021 |
| CN | 112579303 A | | 3/2021 |
| CN | 113112023 A | | 7/2021 |
| CN | 113442948 A | * | 9/2021 |
| CN | 115470061 A | * | 12/2022 |
| CN | 116820663 A | * | 9/2023 |

OTHER PUBLICATIONS

Breitbart, Yuri, Avi Silberschatz, Glenn R. Thompson. "Reliable transaction management in a multidatabase system." ACM SIGMOD Record 19.2 (1990): 215-224.

* cited by examiner

INFERENCE SERVICE MANAGEMENT METHOD, APPARATUS AND SYSTEM FOR INFERENCE PLATFORM, AND MEDIUM

The present disclosure claims the priority of the Chinese patent application filed on Jun. 15, 2021 before the CNIPA, China National Intellectual Property Administration with the present application number of 202110659833.9 and the title of "INFERENCE SERVICE MANAGEMENT METHOD, APPARATUS AND SYSTEM FOR INFERENCE PLATFORM, AND MEDIUM", which is incorporated herein in its entirety by reference.

FIELD

Embodiments of the present application relate to the field of computer technology and, more particularly, to an inference service management method, apparatus, system and non-transitory computer readable storage medium for an inference platform.

BACKGROUND

An AIStation inference platform supports creating a plurality of types of inference services, including a plurality of types, and the inference service relies on various components during the creation and operation. When a component fails, it usually needs to be repaired by redeployment. The redeployment of the component may result in the component-dependent inference services being cleared. In addition, the cluster operation and maintenance personnel may have mis-operation in the background of the server, which may result in the inference service being deleted.

In general, after the inference service is created, the AIStation inference platform records the resources allocated to the inference service and the inference service parameters in the database, and the inference service records in the database have a one-to-one correspondence with the inference services run by the back-end. However, when an inference service is cleared due to a component failure or a user mis-operation at the back end, an inference service record still exists in a database. In addition, in order to maintain the consistency between an inference service record in a database and a real inference service, in the related technology, whether an inference service is deleted is manually checked in the background of a server by a human, and the inference service record is also saved in the database; and if yes, all record items in the database need to be manually cleared and all inference services are deleted, which is not only cumbersome and time-consuming. It is also costly to delete all entries and therefore inference services in case of inconsistencies.

In view of this, how to provide an inference service management method, device, system, and computer readable storage medium for an inference platform for solving the above-mentioned technical problem would have been a problem to be solved by a person skilled in the art.

SUMMARY

One of the objects of the embodiments of the present application is to provide an inference service management method, apparatus, system, and non-transitory computer readable storage medium for an inference platform, which may improve the management efficiency of an inference service and better ensure the consistency between an inference service record and an inference service during use.

In order to solve the above-mentioned technical problem, embodiments of the present application provide an inference service management method for an inference platform, including:
detecting whether there is inference service corresponding to the inference service record in a server according to an inference service record in a database; and if not, restoring the corresponding inference service according to the inference service record; wherein
a corresponding inference service type is acquired according to the inference service record, and the inference service is restored according to the inference service record and a restoration process corresponding to the inference service type;
when the inference service type is a general model, the corresponding restoration process comprises:
parsing the inference service record to obtain a corresponding framework type, a model address and a model class name; parsing the inference service record to determine whether there is a batch processing module record, and if yes, creating a batch processing module; parsing the inference service record to determine whether there is a data processing module record, and if yes, creating a data processing module; when there is a batch processing module record, creating a corresponding inference module according to the batch processing module, the frame type, the model address and the model class name, or when there is no batch processing module record, creating a corresponding inference module according to the frame type, the model address and the model class name; creating corresponding inference service according to the inference module and the data processing module when there is a data processing module record, or creating corresponding inference service according to the inference module when there is no data processing module record;
when the inference service type is application deployment, the corresponding restoration process comprises:
parsing the inference service record to determine whether there is a batch processing module record, and if yes, creating a batch processing module; parsing the inference service record to determine whether there is a data processing module record, and if yes, creating a data processing module; parsing the inference service record to obtain a mirror image address, and when there is a batch processing module record, creating a corresponding inference module according to the batch processing module and the mirror image address, or when there is no batch processing module record, creating a corresponding inference module according to the mirror image address; creating corresponding inference service according to the inference module and the data processing module when there is a data processing module record, or creating corresponding inference service according to the inference module when there is no data processing module record;
when the inference service type is GPU sharing, the corresponding restoration process comprises:
parsing the inference service record to obtain a mirror image address, and creating an instance module according to the mirror image address; parsing the inference service record to obtain a service information address, and creating a service module according to the service information address; and creating corresponding inference service according to the instance module and the service module;

when the inference service type is native deployment, the corresponding restoration process comprises:
parsing the inference service record to obtain a corresponding service type, parsing the inference service according to the service type to obtain service information, and creating corresponding inference service according to the service information;
when the inference service type is margin inference, the corresponding restoration process comprises:
parsing the inference service record to obtain a mirror image address, a node name and port mapping information, and creating corresponding inference service according to the mirror image address, the node name, and the port mapping information.

Alternatively, before the restoring the corresponding inference service according to the inference service record, further including:
determining whether an outlier corresponding to the inference service record reaches a pre-set threshold value;
if yes, executing the step of restoring the corresponding inference service according to the inference service record; and if not, updating the outlier by a pre-set increment.

Alternatively, after the restoring the corresponding inference service according to the inference service record, further including:
detecting whether the inference service is successfully restored, and if yes, setting an outlier corresponding to the inference service record to zero.

Alternatively, the process of detecting whether there is inference service corresponding to the inference service record in a server according to an inference service record in a database includes:
polling each inference service record in the database;
detecting whether there is inference service corresponding to the inference service record in a server according to a current inference service record.

The embodiments of the present application also provide an inference service management apparatus for an inference platform, including:
a detection module configured to detect whether there is inference service corresponding to the inference service record in a server according to an inference service record in a database; and if not, then trigger a restoration module;
the restoration module is configured to restore the corresponding inference service according to the inference service record; wherein:
a corresponding inference service type is acquired according to the inference service record, and the inference service is restored according to the inference service record and a restoration process corresponding to the inference service type;
when the inference service type is a general model, the corresponding restoration process comprises:
parsing the inference service record to obtain a corresponding framework type, a model address and a model class name; parsing the inference service record to determine whether there is a batch processing module record, and if yes, creating a batch processing module; parsing the inference service record to determine whether there is a data processing module record, and if yes, creating a data processing module; when there is a batch processing module record, creating a corresponding inference module according to the batch processing module, the frame type, the model address and the model class name, or when there is no batch processing module record, creating a corresponding inference module according to the frame type, the model address and the model class name; creating corresponding inference service according to the inference module and the data processing module when there is a data processing module record, or creating corresponding inference service according to the inference module when there is no data processing module record;
when the inference service type is application deployment, the corresponding restoration process comprises:
parsing the inference service record to determine whether there is a batch processing module record, and if yes, creating a batch processing module; parsing the inference service record to determine whether there is a data processing module record, and if yes, creating a data processing module; parsing the inference service record to obtain a mirror image address, and when there is a batch processing module record, creating a corresponding inference module according to the batch processing module and the mirror image address, or when there is no batch processing module record, creating a corresponding inference module according to the mirror image address; creating corresponding inference service according to the inference module and the data processing module when there is a data processing module record, or creating corresponding inference service according to the inference module when there is no data processing module record;
when the inference service type is GPU sharing, the corresponding restoration process comprises:
parsing the inference service record to obtain a mirror image address, and creating an instance module according to the mirror image address; parsing the inference service record to obtain a service information address, and creating a service module according to the service information address; and creating corresponding inference service according to the instance module and the service module;
when the inference service type is native deployment, the corresponding restoration process comprises:
parsing the inference service record to obtain a corresponding service type, parsing the inference service according to the service type to obtain service information, and creating corresponding inference service according to the service information;
when the inference service type is margin inference, the corresponding restoration process comprises:
parsing the inference service record to obtain a mirror image address, a node name and port mapping information, and creating corresponding inference service according to the mirror image address, the node name, and the port mapping information.

Alternatively, further including:
a determination module configured to determine whether an outlier corresponding to the inference service record reaches a pre-set threshold value;
if yes, trigger the restoration module; and if not, trigger an update module;
wherein the update module is configured to update the outlier according to a pre-set increment.

The embodiments of the present application also provide an inference service management system for an inference platform, including:
a memory used for storing a computer program; and a processor for implementing the steps of an inference service management method for an inference platform described above when executing the computer program.

The embodiments of the present application also provide a non-transitory computer readable storage medium having stored thereon a computer program which, when executed by a processor, implements the steps of the inference service management method for the inference platform as described above.

The embodiments of the present application provide an inference service management method, apparatus, system and non-transitory computer readable storage medium for an inference platform, the method including: detecting whether there is inference service corresponding to the inference service record in a server according to an inference service record in a database; and if not, then restoring the corresponding inference service according to the inference service record.

It may be seen that in the embodiment of the present application, an inference service in a server is detected according to an inference service record in a database to determine whether there is inference service corresponding to the inference service record in the server, if not, it means that the inference service record is inconsistent with a real inference service, and then the corresponding inference service may be restored according to the inference service record. According to an embodiment of the present application, the inference service may be automatically restored according to the inference service record when the inference service record is inconsistent with the real inference service, which improves the management efficiency of the inference service, and better ensures the consistency of the inference service record and the inference service.

BRIEF DESCRIPTION OF THE DRAWINGS

To describe the technical solutions of the embodiments of the present application more clearly, the following briefly introduces the accompanying drawings required for describing the prior art and the embodiments. Apparently, the accompanying drawings in the following description show only some embodiments of the present application, and a person of ordinary skill in the art may still derive other drawings from these accompanying drawings without creative efforts.

DETAILED DESCRIPTION

The embodiments of the present application provide an inference service management method, apparatus, system, and non-transitory computer readable storage medium for an inference platform, which may improve the management efficiency of an inference service and better ensure the consistency between an inference service record and an inference service during use.

In order that the objects, aspects, and advantages of the embodiments of the present application will become more apparent, a more complete description of the embodiments of the present application will be rendered by reference to the appended drawings, which are provided for purposes of illustration and are not intended to be exhaustive or limiting of the present application. Based on the embodiments in the present application, all other embodiments obtained by a person skilled in the art without involving any inventive effort are within the scope of protection of the present application.

Figure 1:
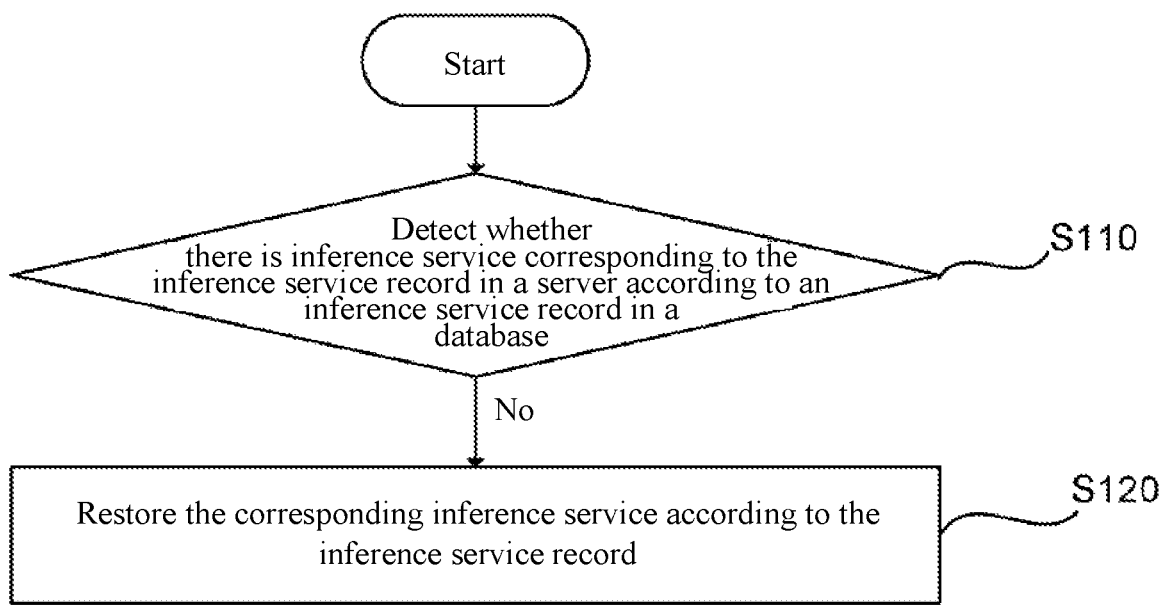
FIG. 1 is a flow diagram of an inference service management method for an inference platform according to an embodiment of the present application.

Reference is now made to FIG. 1, which is a chart of an inference service management method for an inference platform according to an embodiment of the present application. The method includes:

S110: detecting whether there is inference service corresponding to the inference service record in a server according to an inference service record in a database; and if not, the process proceeds to S120.

It should be noted that the method provided in the embodiments of the present application may be specifically but not limited to being used in an AIStation inference platform, and specifically may acquire an inference service record in a database after the inference service platform is started, and detect whether there is inference service corresponding to the inference service record in a server according to the inference service record.

S120: restoring the corresponding inference service according to the inference service record.

According to some embodiments, when there is no inference service corresponding to the inference service record in the server, it means that the inference service record is inconsistent with the inference service at this moment, and it means that the corresponding inference service is deleted, then the corresponding inference service is restored according to the inference service record, that is, the corresponding inference service is restored to the server, so that the consistency between the inference service record and the inference service may be maintained.

Further, the above-mentioned process of restoring the corresponding inference service according to the inference service record in S120 includes:

establishing a corresponding relationship between an inference service type and a restoration process in advance;

acquiring a corresponding inference service type according to an inference service record;

restoring the inference service according to the inference service record and the restoration process corresponding to the inference service type.

That is to say, with regard to different inference service types, the restoration process may be different, and therefore the restoration process of each inference service type may be pre-determined, and a corresponding relationship between the inference service type and the restoration process is established; then after acquiring the corresponding inference service type according to the current inference service record, the restoration process corresponding to the inference service type may be obtained according to the corresponding relationship, and then the corresponding inference service is restored according to the inference service record and the restoration process.

Further, the inference service types in the embodiments of the present application may be generic model, application deployment, GPU sharing, native deployment, or margin inference. Of course, other specific types may also be used, and the embodiments of the present application are not particularly limited.

It should be noted that when the inference service type is a general model, the corresponding restoration process may be:

parsing the inference service record to obtain a corresponding framework type, a model address and a model class name; parsing the inference service record to determine whether there is a batch processing module record, and if yes, creating a batch processing module; parsing the inference service record to determine whether there is a data processing module record, and if yes, creating a data processing module; when there is a batch processing module record, creating a corresponding inference module according to the batch processing module, the frame type, the model address and the model class name, or when there is no batch processing module record, creating a corresponding inference module according to the frame type, the model address and the model class name; creating corresponding inference service according to the inference module and the data processing module when there is a data processing module record, or creating corresponding inference service according to the inference module when there is no data processing module record. That is, first determining how to specifically create an inference module according to whether there is a batch processing module record, and then further determining how to specifically create corresponding inference service according to whether there is a data processing module record.

The frame type is one of PyTorch, Tensorflow, Triton, sklearn, onnx, and xgboost, and when the frame type is PyTorch, when there is a batch processing module record, a corresponding inference module is created according to the batch processing module, the frame type, the model address and the model class name, or when there is no batch processing module record, a corresponding inference module is created according to the frame type, the model address and the model class name; when the frame type is Tensorflow, Triton, sklearn, onnx, and xgboost, then when there is a batch processing module record, a corresponding inference module is created according to the batch processing module, the frame type and the model address, or when there is no batch processing module record, a corresponding inference module is created according to the frame type and the model address.

When the inference service type is an application deployment, the corresponding restoration process may be as follows:
  parsing the inference service record to determine whether there is a batch processing module record, and if yes, creating a batch processing module; parsing the inference service record to determine whether there is a data processing module record, and if yes, creating a data processing module; parsing the inference service record to obtain a mirror image address, and when there is a batch processing module record, creating a corresponding inference module according to the batch processing module and the mirror image address, or when there is no batch processing module record, creating a corresponding inference module according to the mirror image address; creating corresponding inference service according to the inference module and the data processing module when there is a data processing module record, or creating corresponding inference service according to the inference module when there is no data processing module record.

When the inference service type is GPU sharing, the corresponding restoration process may be as follows:
  parsing the inference service record to obtain a mirror image address, and creating an instance module according to the mirror image address; parsing the inference service record to obtain a service information address, and creating a service module according to the service information address; and creating corresponding inference service according to the instance module and the service module.

When the inference service type is native deployment, the corresponding restoration process may be as follows:
  parsing the inference service record to obtain a corresponding service type, parsing the inference service according to the service type to obtain service information, and creating corresponding inference service according to the service information.

According to some embodiments, the service types include Deployment, DaemonSet, Service, and ConfigMap, wherein when the service types are Deployment and DaemonSet, the service information includes a mirror address, a resource and port information; when the service type is Service, then the service information includes information about a selection label, a node port, a protocol, a target port, and an internal port; when the service type is ConfigMap, the service information includes data information.

When the inference service type is margin inference, the corresponding restoration process may be:
  parsing the inference service record to obtain a mirror image address, a node name and port mapping information, and creating corresponding inference service according to the mirror image address, the node name, and the port mapping information.

Further, before restoring the corresponding inference service according to the inference service record, the method further includes:
  determining whether an outlier corresponding to the inference service record reaches a pre-set threshold value;
  if yes, executing the step of restoring the corresponding inference service according to the inference service record; and if not, updating the outlier by a pre-set increment.

It should be noted that, in practice, when a user manages an inference service platform, the inference service in a server may be actively deleted according to requirements, and when it is not available to delete an inference service record corresponding to the inference service in a database, the inconsistency between the inference service record and the inference service may be caused, and the inconsistency is a normal inconsistency, namely, the inconsistency is not caused by the inference service being deleted due to component failure or user mis-operation, and therefore the inconsistency is considered to be a normal inconsistency, and the inference service may not be restored in this case. In order embodiments of the present application, in order to not restore the inference service which is normally deleted by a user, a pre-set threshold value may be set it is detected that there is no corresponding inference service in a server, an outlier corresponding to the inference service may be acquired; and if the outlier reaches the pre-set threshold value, it is indicated that the inference service is abnormal and inconsistent, that is to say, the inference service is deleted due to component failure or user mis-operation, and at this moment, the corresponding inference service needs to be restored according to an inference service record.

The outlier may be an abnormal duration, that is to say, a detection time interval may be set, the abnormal duration is updated each time the abnormality is detected, and a corresponding pre-set threshold value is a duration threshold value, so that when the abnormal duration of the inference service reaches the pre-set duration, it may be stated that the inference service is not an inference service deleted by a user due to normal requirements, and then the inference service needs to be restored; if the inference service record is detected this time, and the corresponding abnormal duration does not reach a pre-set threshold, and the inference service record is not detected in the next detection, then it means that after deleting the inference service, the user deletes the corresponding inference service record from the database; the outlier may also be the number of times of abnormal detection, and also the corresponding pre-set threshold value is a pre-set number of times threshold value; when it is detected that the number of times of abnormal of the inference service record does not reach the pre-set number of times threshold value, one may be added to the number of times of abnormal of the inference service record until the number of times of abnormal reaches the pre-set number of times threshold value and then the corresponding inference service is restored, or until the inference service record is not detected. Which method is used may be determined according to actual needs, and the embodiments of the present application are not particularly limited.

Further, after restoring the corresponding inference service according to the inference service record, the method may further include:

detecting whether the inference service is successfully restored, and if yes, setting an outlier corresponding to the inference service record to zero.

That is to say, after the corresponding inference service is restored, whether there is inference service in a server may be further detected, and if yes, it means that the restoration is successful, and at this moment, an outlier of an inference service record corresponding to the inference service may be set to 0 to be counted again when an anomaly occurs next time; when there is inference service in the server, it means that the restored is not successful, the next detection may be waited at this time, and if the corresponding inference service record is still detected at the next detection, the corresponding inference service is restored again.

Further, in S110, the detecting whether there is inference service corresponding to the inference service record in a server according to an inference service record in a database includes:

polling each inference service record in the database;
detecting whether there is inference service corresponding to the inference service record in a server according to a current inference service record.

That is to say, in practice, all the inference service records in the database may be polled, and according to the currently polled inference service records, whether there is corresponding inference service in the server is detected, and when there is no corresponding inference service in the server, whether the corresponding inference service needs to be restored according to a corresponding outlier is determined, and when the corresponding inference service needs to be restored, a restoration operation is performed.

It may be seen that in the embodiment of the present application, an inference service in a server is detected according to an inference service record in a database to determine whether there is inference service corresponding to the inference service record in the server, if not, it means that the inference service record is inconsistent with a real inference service, and then the corresponding inference service may be restored according to the inference service record. According to an embodiment of the present application, the inference service may be automatically restored according to the inference service record when the inference service record is inconsistent with the real inference service, which improves the management efficiency of the inference service, and better ensures the consistency of the inference service record and the inference service.

Figure 2:
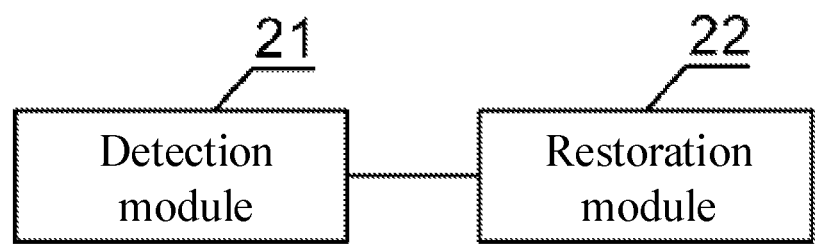
FIG. 2 is a schematic structural diagram of an inference service management apparatus for an inference platform according to an embodiment of the present application.

Based on the above-mentioned embodiments, the embodiments of the present application further provide an inference service management apparatus for an inference platform, and with reference to FIG. 2 in particular, the apparatus includes:

a detection module 21 configured to detect whether there is inference service corresponding to the inference service record in a server according to an inference service record in a database; and if not, then trigger a restoration module;

a restoration module 22 configured to restore the corresponding inference service according to the inference service record; wherein:

a corresponding inference service type is acquired according to the inference service record, and the inference service is restored according to the inference service record and a restoration process corresponding to the inference service type;

when the inference service type is a general model, the corresponding restoration process includes:

parsing the inference service record to obtain a corresponding framework type, a model address and a model class name; parsing the inference service record to determine whether there is a batch processing module record, and if yes, creating a batch processing module; parsing the inference service record to determine whether there is a data processing module record, and if yes, creating a data processing module; when there is a batch processing module record, creating a corresponding inference module according to the batch processing module, the frame type, the model address and the model class name, or when there is no batch processing module record, creating a corresponding inference module according to the frame type, the model address and the model class name; creating corresponding inference service according to the inference module and the data processing module when there is a data processing module record, or creating corresponding inference service according to the inference module when there is no data processing module record;

when the inference service type is application deployment, the corresponding restoration process includes:

parsing the inference service record to determine whether there is a batch processing module record, and if yes, creating a batch processing module; parsing the inference service record to determine whether there is a data processing module record, and if yes, creating a data processing module; parsing the inference service record to obtain a mirror image address, and when there is a batch processing module record, creating a corresponding inference module according to the batch processing module and the mirror image address, or when there is no batch processing module record, creating a corresponding inference module according to the mirror image address; creating corresponding inference service according to the inference module and the data processing module when there is a data processing module record, or creating corresponding inference service according to the inference module when there is no data processing module record.

when the inference service type is GPU sharing, the corresponding restoration process includes:

parsing the inference service record to obtain a mirror image address, and creating an instance module according to the mirror image address; parsing the inference service record to obtain a service information address, and creating a service module according to the service information address; and creating corresponding inference service according to the instance module and the service module.

when the inference service type is native deployment, the corresponding restoration process includes:

parsing the inference service record to obtain a corresponding service type, parsing the inference service according to the service type to obtain service information, and creating corresponding inference service according to the service information;

when the inference service type is margin inference, the corresponding restoration process includes:

parsing the inference service record to obtain a mirror image address, a node name and port mapping information, and creating corresponding inference service according to the mirror image address, the node name, and the port mapping information.

Further, the apparatus may further include:

a determination module configured to determine whether an outlier corresponding to the inference service record reaches a pre-set threshold value;

if yes, trigger the restoration module 22; and if not, trigger an update module;

an update module is configured to update the outlier according to a pre-set increment.

Based on the above-mentioned embodiments, the embodiments of the present application further provide an inference service management system for an inference platform including:

a memory used for storing a computer program; and
a processor for implementing the steps of an inference service management method as described above for an inference platform when executing a computer program.

For example, the processor in the embodiment of the present application may be used for detecting whether there is inference service corresponding to the inference service record in a server according to an inference service record in a database; and if not, then restoring the corresponding inference service according to the inference service record.

Based on the above-mentioned embodiments, the embodiments of the present application also provide a computer readable storage medium having stored thereon a computer program which when executed by a processor implements the steps of an inference service management method of an inference platform as described above.

The computer readable storage medium may include: various media may store the program code, such as U-disk, removable hard disk, Read-Only Memory (ROM), Random Access Memory (RAM), magnetic or optical disk.

Various embodiments are described in this description in a progressive manner, with each embodiment focusing on differences from the other embodiments, with like parts referring to each other. The apparatus disclosed in the examples is relatively simple to describe, since it corresponds to the method disclosed in the examples, as explained in the method section.

It should also be noted that the use of relational terms such as first and second, and the like in the description are used solely to distinguish one entity or operation from another entity or operation without necessarily requiring or implying any actual such relationship or order between such entities or operations. Further, the terms "include", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by the phrase "includes a . . . " does not, without more constraints, preclude the existence of additional identical elements in the process, method, article, or apparatus that includes the element.

The previous description of the disclosed embodiments is provided to enable any person skilled in the art to make or use the present application. Various modifications to these embodiments will be readily apparent to a person skilled in the art, and the generic principles defined herein may be implemented in other embodiments without departing from the spirit or scope of the present application. Thus, the present application is not intended to be limited to the embodiments shown herein but is to be accorded the widest scope consistent with the principles and novel features disclosed herein.

The invention claimed is:

1. An inference service management method for an inference platform, comprising:

detecting whether there is inference service corresponding to the inference service record in a server according to an inference service record in a database; and if not, then restoring the corresponding inference service according to the inference service record; wherein a corresponding inference service type is acquired according to the inference service record, and the inference service is restored according to the inference service record and a restoration process corresponding to the inference service type;

when the inference service type is a general model, the corresponding restoration process comprises:

parsing the inference service record to obtain a corresponding framework type, a model address and a model class name; parsing the inference service record to determine whether there is a batch processing module record, and if yes, creating a batch processing module; parsing the inference service record to determine whether there is a data processing module record, and if yes, creating a data processing module; when there is a batch processing module record, creating a corresponding inference module according to the batch processing module, the frame type, the model address and the model class name, or when there is no batch processing module record, creating a corresponding inference module according to the frame type, the model address and the model class name; creating corresponding inference service according to the inference module and the data processing module when there is a data processing module record, or creating corresponding inference service according to the inference module when there is no data processing module record;

when the inference service type is application deployment, the corresponding restoration process comprises:

parsing the inference service record to determine whether there is a batch processing module record, and if yes, creating a batch processing module; parsing the inference service record to determine whether there is a data processing module record, and if yes, creating a data processing module; parsing the inference service record to obtain a mirror image address, and when there is a batch processing module record, creating a corresponding inference module according to the batch processing module and the mirror image address, or when there is no batch processing module record, creating a corresponding inference module according to the mirror image address; creating corresponding inference service according to the inference module and the data processing module when there is a data processing module record, or creating corresponding inference service according to the inference module when there is no data processing module record;

when the inference service type is GPU sharing, the corresponding restoration process comprises:

parsing the inference service record to obtain a mirror image address, and creating an instance module according to the mirror image address; parsing the inference service record to obtain a service information address, and creating a service module according to the service information address; and creating corresponding inference service according to the instance module and the service module;

when the inference service type is native deployment, the corresponding restoration process comprises:

parsing the inference service record to obtain a corresponding service type, parsing the inference service according to the service type to obtain service information, and creating corresponding inference service according to the service information;

when the inference service type is margin inference, the corresponding restoration process comprises:

parsing the inference service record to obtain a mirror image address, a node name and port mapping information, and creating corresponding inference service according to the mirror image address, the node name, and the port mapping information.

2. The inference service management method for an inference platform according to claim 1, wherein before the restoring the corresponding inference service according to the inference service record, the method further comprises:

determining whether an outlier corresponding to the inference service record reaches a pre-set threshold value;

if yes, executing the step of restoring the corresponding inference service according to the inference service record; and if not, updating the outlier by a pre-set increment.

3. The inference service management method for an inference platform according to claim 2, wherein after the restoring the corresponding inference service according to the inference service record, the method further comprises:

detecting whether the inference service is successfully restored, and if yes, setting an outlier corresponding to the inference service record to zero.

4. The inference service management method for an inference platform according to claim 2, wherein the outlier is an abnormal duration, a detection time interval may be set, the abnormal duration is updated each time an abnormality is detected, and a corresponding pre-set threshold value is a duration threshold value, so that when the abnormal duration of the inference service reaches the pre-set duration, the inference service requires to be restored.

5. The inference service management method for an inference platform according to claim 2, wherein the outlier is the number of times of abnormal detection, and the corresponding pre-set threshold value is a pre-set number of times threshold value; when it is detected that the number of times of abnormal of the inference service record does not reach the pre-set number of times threshold value, one is added to the number of times of abnormal of the inference service record until the number of times of abnormal reaches the pre-set number of times threshold value and then the corresponding inference service is restored, or until the inference service record is not detected.

6. The inference service management method for an inference platform according to claim 1, wherein the process of detecting whether there is inference service corresponding to the inference service record in a server according to an inference service record in a database comprises:

polling each inference service record in the database;

detecting whether there is inference service corresponding to the inference service record in a server according to a current inference service record.

7. The inference service management method for an inference platform according to claim 1, wherein the process of restoring the corresponding inference service according to the inference service record comprises:

establishing a corresponding relationship between an inference service type and a restoration process in advance;

acquiring a corresponding inference service type according to an inference service record;

restoring the inference service according to the inference service record and the restoration process corresponding to the inference service type.

8. The inference service management method for an inference platform according to claim 1, wherein the frame type is one of PyTorch, Tensorflow, Triton, sklearn, onnx, and xgboost.

9. The inference service management method for an inference platform according to claim 8, wherein when the frame type is the PyTorch, when there is a batch processing module record, a corresponding inference module is created according to the batch processing module, the frame type, the model address and the model class name, or when there is no batch processing module record, a corresponding inference module is created according to the frame type, the model address and the model class name; when the frame type is one of the Tensorflow, the Triton, the sklearn, the onnx, and the xgboost, then when there is a batch processing module record, a corresponding inference module is created according to the batch processing module, the frame type and the model address, or when there is no batch processing module record, a corresponding inference module is created according to the frame type and the model address.

10. The inference service management method for an inference platform according to claim 1, wherein the service type includes one of Deployment, DaemonSet, Service, and ConfigMap.

11. The inference service management method for an inference platform according to claim 10, wherein when the service types are one of the Deployment and the DaemonSet, the service information includes a mirror address, a resource and port information; when the service type is the Service, then the service information includes information about a selection label, a node port, a protocol, a target port, and an internal port; when the service type is the ConfigMap, the service information includes data information.

12. An inference service management system for an inference platform, comprising:

a memory used for storing a computer program; and a processor for implementing the steps of an inference service management method for an inference platform according to claim 1 when executing the computer program.

13. The inference service management system for an inference platform according to claim 12, wherein before the restoring the corresponding inference service according to the inference service record, the method further comprises:
- determining whether an outlier corresponding to the inference service record reaches a pre-set threshold value;
- if yes, executing the step of restoring the corresponding inference service according to the inference service record; and if not, updating the outlier by a pre-set increment.

14. The inference service management system for an inference platform according to claim 13, wherein after the restoring the corresponding inference service according to the inference service record, the method further comprises:
- detecting whether the inference service is successfully restored, and if yes, setting an outlier corresponding to the inference service record to zero.

15. The inference service management system for an inference platform according to claim 12, wherein the process of detecting whether there is inference service corresponding to the inference service record in a server according to an inference service record in a database comprises:
- polling each inference service record in the database;
- detecting whether there is inference service corresponding to the inference service record in a server according to a current inference service record.

16. A non-transitory computer readable storage medium, wherein the computer readable storage medium has stored thereon a computer program which when executed by a processor implements the steps of an inference service management method for an inference platform according to claim 1.

17. The non-transitory computer readable storage medium according to claim 16, wherein before the restoring the corresponding inference service according to the inference service record, the method further comprises:
- determining whether an outlier corresponding to the inference service record reaches a pre-set threshold value;
- if yes, executing the step of restoring the corresponding inference service according to the inference service record; and if not, updating the outlier by a pre-set increment.

18. The non-transitory computer readable storage medium according to claim 17, wherein after the restoring the corresponding inference service according to the inference service record, the method further comprises:
- detecting whether the inference service is successfully restored, and if yes, setting an outlier corresponding to the inference service record to zero.

\* \* \* \* \*